US008567225B2

(12) United States Patent
Okada et al.

(10) Patent No.: US 8,567,225 B2
(45) Date of Patent: Oct. 29, 2013

(54) METHOD AND APPARATUS FOR MANUFACTURING A BENT MEMBER

(75) Inventors: Nobuhiro Okada, Hyogo (JP); Atsushi Tomizawa, Minoh (JP); Naoaki Shimada, Osaka (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/542,840

(22) Filed: Jul. 6, 2012

(65) Prior Publication Data

US 2013/0000375 A1 Jan. 3, 2013

Related U.S. Application Data

(63) Continuation of application No. PCT/JP2011/050091, filed on Jan. 6, 2011.

(30) Foreign Application Priority Data

Jan. 6, 2010 (JP) ................................ 2010-001383

(51) Int. Cl.
*B21D 9/04* (2006.01)

(52) U.S. Cl.
USPC ............ 72/369; 72/128; 72/342.5; 72/342.6; 72/342.94

(58) Field of Classification Search
USPC .......... 72/31.04, 128, 307, 318, 342.2, 342.5, 72/342.6, 342.94, 369
See application file for complete search history.

(56) References Cited

U.S. PATENT DOCUMENTS

| | | | | | |
|---|---|---|---|---|---|
| 1,891,338 | A * | 12/1932 | Snell | ............................... | 72/128 |
| 4,151,732 | A * | 5/1979 | Hofstede et al. | ............... | 72/16.4 |
| 4,177,661 | A * | 12/1979 | Schwarzbach et al. | ......... | 72/128 |
| 4,596,128 | A * | 6/1986 | Ringersma et al. | ............. | 72/128 |
| 6,736,910 | B2 * | 5/2004 | Toyooka et al. | .............. | 148/320 |
| 6,954,679 | B1 * | 10/2005 | Takeda et al. | ................. | 700/165 |
| 7,269,986 | B2 * | 9/2007 | Pfaffmann et al. | ............... | 72/60 |
| 2008/0066517 | A1 * | 3/2008 | Tomizawa et al. | .............. | 72/364 |

FOREIGN PATENT DOCUMENTS

| | | |
|---|---|---|
| JP | 60-076232 | 4/1985 |
| JP | 2000-094043 | 4/2000 |
| JP | 2002-187730 | 7/2002 |
| JP | 2006-240441 | 9/2006 |
| JP | 2009-050903 | 3/2009 |
| JP | 2009-233731 | 10/2009 |
| JP | 2009-291820 | 12/2009 |
| WO | 2006/093006 | 9/2006 |
| WO | 2008-123505 | 10/2008 |

* cited by examiner

*Primary Examiner* — Edward Tolan
(74) *Attorney, Agent, or Firm* — Clark & Brody

(57) ABSTRACT

A bent member having excellent dimensional accuracy is manufactured by stably forming a high temperature portion uniformly in the circumferential direction of a steel tube and in a narrow region in the axial direction of the steel. The bent member is manufactured by supporting a steel tube at a first position while feeding it, performing induction heating of the steel tube at a second position with an induction heating coil, cooling the steel tube at a third position to form a high temperature portion which moves in the axial direction of the steel tube, and three-dimensionally varying the position of a gripping mechanism for the steel tube in a region to apply a bending moment to the high temperature portion.

10 Claims, 9 Drawing Sheets

10
11
1
12
13
14a
14
1a
16
17
18
15
19
20
22
23
24
25
26
27
A
B
C
D
X
Y
Z
M 32-1
32-2
Temp(°C)
1.00×10³
9.60×10²
9.20×10²
8.80×10²
8.40×10²
8.00×10²
25kHz-5mm/sec
25kHz-10mm/sec
25kHz-50mm/sec
25kHz-75mm/sec
25kHz-100mm/sec
25kHz-125mm/sec
25kHz-150mm/sec
31

32-1
32-2
Temp(°C)
1.00×10³
9.60×10²
9.20×10²
8.80×10²
8.40×10²
8.00×10²
5kHz-100mm/sec
10kHz-100mm/sec
25kHz-100mm/sec
50kHz-100mm/sec
75kHz-100mm/sec
100kHz-100mm/sec
31
31
31
31
31
31

METHOD AND APPARATUS FOR MANUFACTURING A BENT MEMBER

TECHNICAL FIELD

This invention relates to a method and apparatus for manufacturing a bent member.

BACKGROUND ART

Strength members, reinforcing members, and structural members made of metal are used in automobiles and various types of machinery. A high strength, a low weight, and a small size are demanded of these members. In the past, these members have been manufactured by welding of press worked steel parts, punching of thick steel plates, or forging of aluminum alloys. Decreases in the weight and size of bent members achieved by these manufacturing methods have reached a limit. In Patent Document 1, the present applicant disclosed a manufacturing apparatus for a bent member.

FIG. 12 is an explanatory view schematically showing that manufacturing apparatus 0. The manufacturing apparatus 0 manufactures a bent member 8 by bending a metal tube 1 (in the following explanation, an example will be given of the case in which the metal tube is a steel tube) which is supported by a support mechanism 2 so as to be able to move in its axial direction, the bending being performed on the downstream side of the support mechanism 2 while feeding the steel tube 1 from the upstream side to the downstream side with a feed mechanism 3.

On the downstream side of the support mechanism 2, an induction heating coil 5 rapidly carries out induction heating of the steel tube 1 being fed in the axial direction to a temperature range (to at least the $Ac_3$ point) at which the steel tube 1 can be locally quench-hardened. A water cooling mechanism 6 rapidly cools the steel tube 1 immediately downstream of the induction heating coil 5. As a result, a high temperature portion 1*a* which moves in the axial direction of the steel tube 1 is locally formed in the steel tube. The resistance to deformation of the high temperature portion 1*a* is markedly lower than the resistance to deformation of other portions.

A movable roller die 4 has at least one roll pair 4*a*. The roll pair 4*a* supports the steel tube 1 while feeding it. In a region downstream of the water cooling mechanism 6, the movable roller die 4 moves two-dimensionally or three-dimensionally while supporting the steel tube 1, thereby applying a bending moment to the high temperature portion 1*a* of the steel tube.

In this manner, the manufacturing apparatus 0 manufactures a bent member 8 having a desired shape and a high strength (such as a tensile strength of at least 780 MPa) by bending the steel tube 1 with a high operating efficiency by simple steps using relatively inexpensive components 2-6.

PRIOR ART DOCUMENTS

Patent Documents

Patent Document 1: WO 2006/093006

DISCLOSURE OF INVENTION

In order for the manufacturing apparatus 0 to manufacture a bent member 8 having excellent dimensional accuracy, it is extremely important to form the high temperature portion 1*a* in a region which is narrow in the axial direction of the steel tube 1 and which is uniform in the circumferential direction of the steel tube 1.

There is generally great variation in the region where the high temperature portion 1*a* is formed depending upon the feed speed of the steel tube 1, the wall thickness of the steel tube 1, and the frequency of the current supplied to the induction heating coil 5 (referred to in this description as the current frequency). If these conditions are not suitable, a high temperature portion 1*a* cannot be formed in a desired condition, and the dimensional accuracy of the bent member 8 decreases.

The present invention is based on the new finding that in a manufacturing apparatus 0, in order to stably form a high temperature portion 1*a* in a narrow region in the axial direction and uniformly in the circumferential direction of a steel tube 1, (a) when the steel tube 1 has a wall thickness of at most 2.0 mm, it is effective to make the feed speed V of the steel tube 1 a value of 5-150 mm/sec and to use an induction heating coil having one winding as the induction heating coil 5 and to supply the induction heating coil 5 with an alternating current with a current frequency of 5-100 kHz, and (b) when the wall thickness of the steel tube 1 is greater than 2.0 mm and at most 3.0 mm, it is effective to use an induction heating coil having two windings as the induction heating coil 5, and to adjust the current frequency f (kHz) of the induction heating coil 5 and the feed speed V (mm/sec) of the steel tube 1 so as to satisfy the relationships given by Equation (1): $f<3000/V$ and Equation (2): $f\geq 0.08\,V$.

The present invention is a method of manufacturing a bent member intermittently or continuously having in its lengthwise direction a bent portion which is bent three-dimensionally by supporting an elongated hollow metal material having a closed transverse cross-sectional shape at a first position while feeding it in its lengthwise direction, forming a high temperature portion which moves in the axial direction of the metal material by performing induction heating of the metal material with an induction heating coil at a second position located downstream of the first position in the feed direction of the metal material and cooling the heated metal material at a third position located downstream of the second position in the feed direction of the metal material, and applying a bending moment to the high temperature portion by three-dimensionally varying the position of a gripping mechanism which grips the metal material in a region downstream of the third position in the feed direction of the metal material, characterized in that when the metal material has a wall thickness of at most 2.0 mm, the feed speed of the metal material is made 5-150 mm/sec, an induction heating coil having 1 winding is used as the induction heating coil, and an alternating current having a current frequency of 5-100 kHz is supplied to the induction heating coil, and/or when the wall thickness of the metal material is greater than 2.0 mm and at most 3.0 mm, an induction heating coil having 2 windings is used as the induction heating coil, and the current frequency f (kHz) and the feed speed V (mm/sec) of the metal material are adjusted so as to satisfy Equation (1): $f<3000/V$ and Equation (2): $f\geq 0.08\,V$, wherein 5 kHz$\leq f\leq$100 kHz and 5 mm/sec$\leq V\leq$150 mm/sec.

From another standpoint, the present invention is a manufacturing apparatus for a bent member having a feed mechanism for feeding an elongated, hollow metal material having a closed transverse cross-sectional shape in its lengthwise direction, a support mechanism for supporting the metal material being fed at a first position, a heating mechanism for performing induction heating of the metal material being fed at a second position located downstream of the first position in the feed direction of the metal material, a cooling mechanism for cooling the metal material at a third position located downstream of the second position in the feed direction of the metal material thereby locally forming in the metal material a high temperature portion which moves in the axial direction of the metal material, and a gripping mechanism for applying a bending moment to the high temperature portion by moving three-dimensionally while gripping the metal material being fed in a region located downstream of the third position in the feed direction of the metal material, characterized in that when the metal material has a wall thickness of at most 2.0 mm, the feed mechanism feeds the metal material at a speed V of 5-150 mm/sec, the heating mechanism has an induction heating coil with 1 winding, and the induction heating coil is supplied with alternating current having a current frequency of 5-100 kHz, and/or when the wall thickness of the metal material is greater than 2.0 mm and at most 3.0 mm, the heating mechanism is an induction heating coil with 2 windings and the feed mechanism and the heating mechanism adjust the feed speed V (mm/sec) of the metal material by the feed mechanism and the current frequency f (kHz) of the induction heating coil so as to satisfy the relationships $f<3000/V$ and $f\geq 0.08$ V, wherein 5 kHz$\leq f\leq$100 kHz and 5 mm/sec$\leq V\leq$150 mm/sec.

In the present invention, depending on the wall thickness of the metal material which is either at most 2.0 mm or greater than 2.0 mm and at most 3.0 mm, namely, by taking into consideration the wall thickness of the metal material, a bent member may be manufactured under either of the above conditions.

In the present invention, it is preferable to satisfy at least one of the following features (A) to (E):

(A) the bent member has at least two bent portions in its lengthwise direction with different radii of curvature.

(B) the metal material has a transverse cross-sectional shape which is circular, rectangular, elliptical, oblong, polygonal, a combination of a polygon and a circle, or a combination of a polygon and an ellipse, (C) the gripping mechanism grips the metal material by being inserted into a leading end of the metal material or by contacting the outer surface of a leading end of the metal material, (D) the metal material being fed is hardened in at least one location in its circumferential direction by being locally heated at the second position to a temperature at which quench hardening is possible and by being cooled at the third position, and (E) the bent member has an intermittent or a continuous hardened portion in the lengthwise direction and/or in the circumferential direction in a cross section crossing the lengthwise direction.

According to the present invention, it is possible to stably form a high temperature portion in a narrow region in the axial direction of a metal material and uniformly in the circumferential direction of the metal material using the manufacturing apparatus of Patent Document 1, so it becomes possible to manufacture a bent member with high dimensional accuracy.

EXPLANATION OF SYMBOLS

Figure 1:
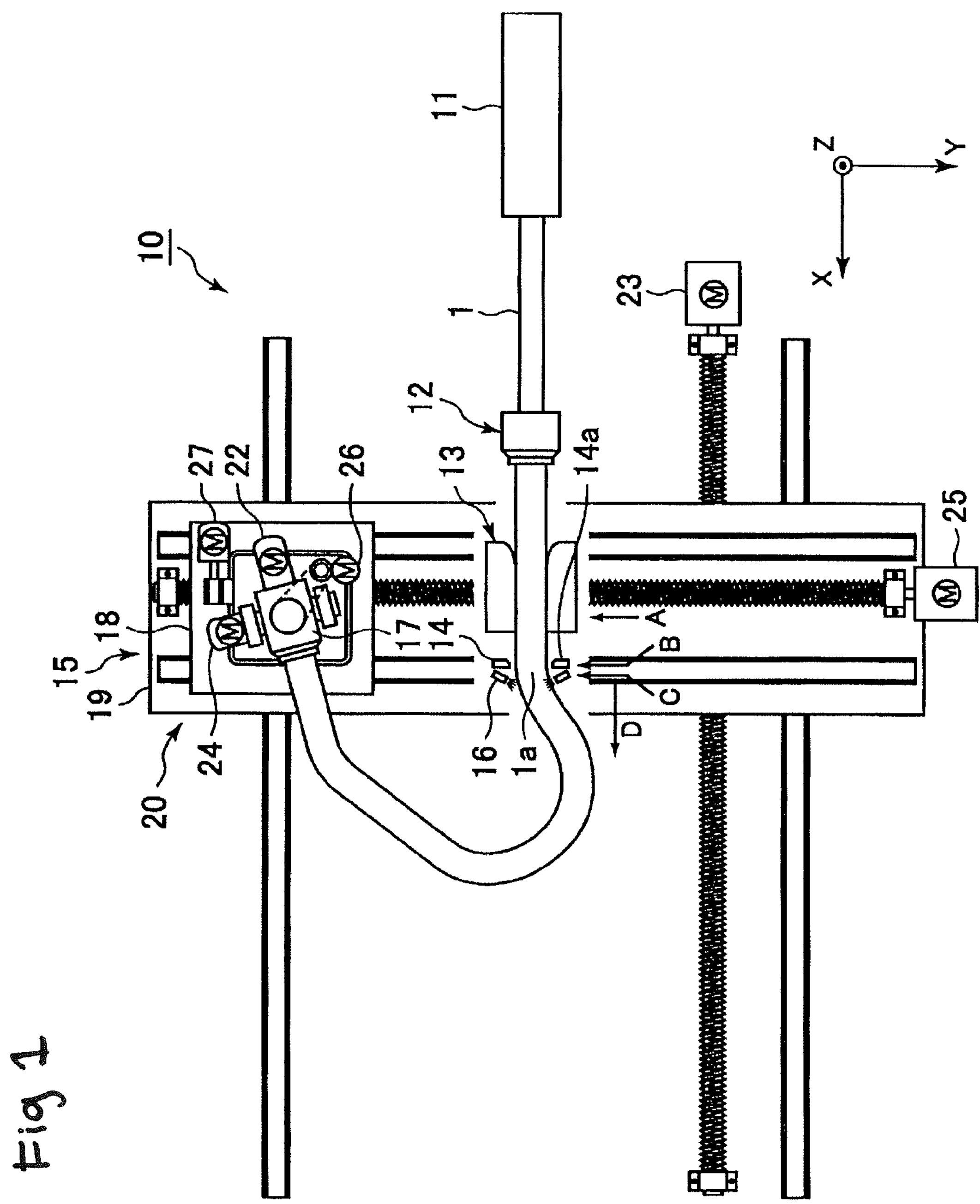
FIG. 1 is an explanatory view schematically showing in simplified form an example of the structure of a manufacturing apparatus according to the present invention.

0 manufacturing apparatus
1 metal material
1*a* high temperature portion
2 support mechanism
3 feed mechanism
4 movable roller die
4*a* roll pair
5 induction heating coil
6 water cooling mechanism
10, 10-1 manufacturing apparatus
11 feed mechanism
12 chuck
13 support mechanism
14 heating mechanism
14*a* induction heating coil
15 gripping mechanism
16 cooling mechanism
17 body
18 first base
19 second base
20 moving mechanism
22 x axis tilt motor
23 x axis shift motor
24 y axis tilt motor
25 y axis shift motor
26 z axis tilt motor
27 x axis shift motor
30 model for numerical analysis
31 steel tube
31 a high temperature portion
32, 32-1, 32-2 induction heating coil

MODES FOR CARRYING OUT THE INVENTION

FIG. 1 is an explanatory view schematically showing in simplified form the structure of an example of a manufacturing apparatus 10 according to the present invention.

As shown in this figure, the manufacturing apparatus 10 has a feed mechanism 11, a support mechanism 13, a heating mechanism 14, a cooling mechanism 16, and a gripping mechanism 15. These components will be explained in sequence.

[Feed Mechanism 11]

The feed mechanism 11 feeds a metal material 1 in its lengthwise direction. The metal material 1 is an elongated hollow member having a closed cross-sectional shape. In the following explanation, an example will be given of the case in which the metal material 1 is a steel tube. The present invention is not limited to the case in which the metal material is a steel tube 1. For example, a hollow metal material having a transverse cross-sectional shape of a rectangle, an ellipse, an oblong shape, a polygon, or a combination of a polygon and a circle, or a combination of a polygon and an ellipse can be used in the same manner as a steel tube 1.

An example of the feed mechanism 11 is a feed mechanism using an electric servo cylinder. The feed mechanism 11 is not restricted to a specific type. Known feed mechanisms such as a feed mechanism using a ball screw or a feed mechanism using a timing belt or a chain can be used equally well as the feed mechanism 11.

The steel tube 1 is movably supported by a chuck 12 and is fed by the feed mechanism 11 at a predetermined feed speed V (mm/sec) in its axial direction (lengthwise direction). The chuck 12 supports the steel tube 1 in order to feed the steel tube 1. The chuck 12 may be omitted.

[Support Mechanism 13]

The support mechanism 13 movably supports the steel tube 1 which is being fed in its axial direction by the feed mechanism 11 at a first position A.

An example of the support mechanism 13 is a fixed guide. The support mechanism 13 is not limited to a specific type of support mechanism. One or more pairs of opposing non-driven rolls may be used as the support mechanism 13. A known support mechanism can be used equally well as the support mechanism 13.

The steel tube 1 passes the installation position A of the support mechanism 13 and is fed in its axial direction. The support mechanism 13 may be replaced by the chuck 12.

[Heating Mechanism 14]

The heating mechanism 14 performs induction heating of the steel tube 1 being fed. The heating mechanism 14 is disposed at a second position B located downstream of the first position A in the feed direction of the steel tube 1.

In the manufacturing apparatus 10, when the wall thickness of the steel tube 1 is at most 2.0 mm, the feed mechanism 11 feeds the steel tube 1 with a feed speed V of 5-150 mm/sec. The heating mechanism 14 has an induction heating coil 14*a* with 1 winding, and the induction heating coil 14*a* is supplied with an alternating current having a current frequency of 5-100 kHz.

In the manufacturing apparatus 10, when the wall thickness of the steel tube 1 is greater than 2.0 mm and at most 3.0 mm, the heating mechanism 14 has an induction heating coil 14*a* with 2 windings. The feed mechanism 11 and the heating mechanism 14 adjust the feed speed V (mm/sec) of the steel tube 1 by the feed mechanism 11 and the current frequency f (kHz) of the alternating current supplied to the induction heating coil 14*a* so as to satisfy the relationships:

$$f<3000/V \text{ and } f\geq 0.08\ V$$

wherein 5 kHz≤f≤100 kHz and 5 mm/sec≤V≤150 mm/sec.

"An induction heating coil having 1 winding" is not limited to an induction heating coil in which the coil body completely surrounds the periphery of the steel tube 1. "An induction heating coil have 1 winding" includes an induction heating coil having a coil body which surrounds most of the steel tube 1 but does not surround a portion of the outer periphery of the steel tube 1. Specifically, an induction heating coil having a coil body which surrounds at least 70% of the outer periphery of the steel tube 1 falls within the scope of "an induction heating coil having 1 winding".

The reason for defining the feed speed and current frequency as above will be explained while referring to the results of numerical analysis conducted by the present inventors.

(Numerical Analysis Conditions)

Figure 2:
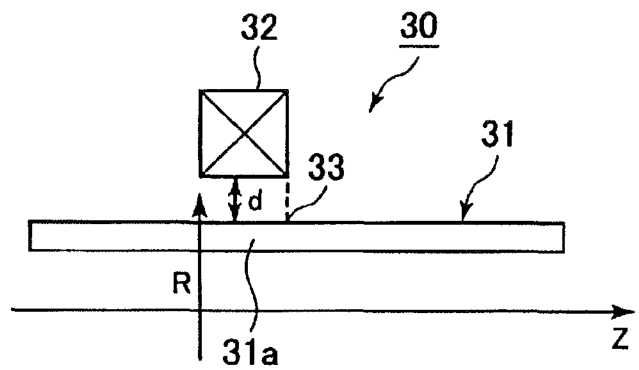
FIG. 2 is an explanatory view showing a model of a shape obtained by numerical analysis.

FIG. 2 is an explanatory view showing a model 30 for numerical analysis. As shown in FIG. 2, the numerical analysis model 30 has cylindrical two coordinates.

In this numerical analysis, the shape of the high temperature portion 31*a* formed when the wall thickness of the steel tube 31, the current frequency f of the current supplied to the induction heating coil 32, and the feed speed V of the steel tube 31 were varied was investigated by magnetic field analysis and heat transfer analysis.

Assuming that the induction heating coil 32 was constituted by a copper tube having a square transverse cross-sectional shape measuring 15 mm on a side, numerical analysis was carried out under the following conditions:

diameter of steel tube 31: 38.1 mm distance d between the induction heating coil 32 and the steel tube 31: 3 mm current frequency f: 5, 10, 25, 50, 75, or 100 kHz (6 levels)

wall thickness of steel tube 31: 1.0, 2.0, or 3.0 mm (3 levels)

feed speed V of steel tube 31: 5, 10, 50, 75, 100, 125, or 150 mm/sec (7 levels).

The position for the start of cooling of the heated steel tube 31 was 10 mm downstream of the projected position 33 of the end of the induction heating coil 32.

(Results of Numerical Analysis)

Figure 3:
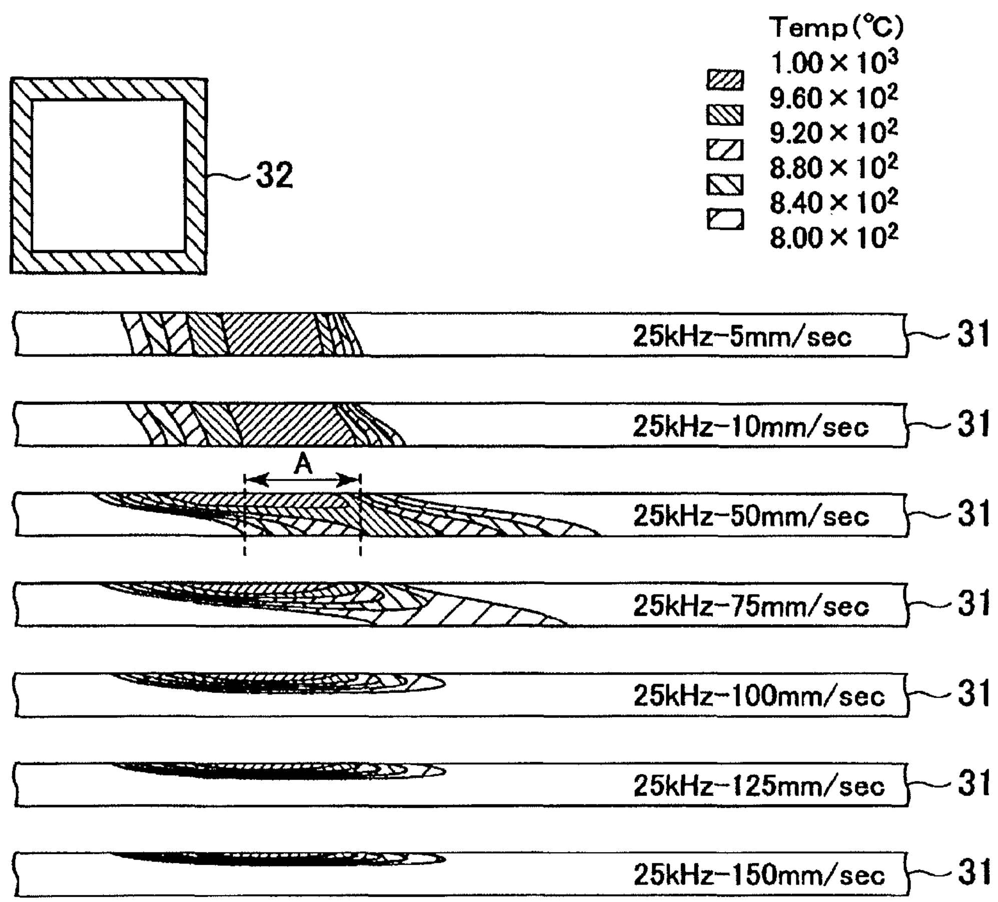
FIG. 3 is an explanatory view showing the results of numerical analysis of the temperature distribution in a steel tube for the case in which the wall thickness of the steel tube is 3 mm and the current frequency f supplied to an induction heating coil is 25 kHz.

FIG. 3 shows the results of numerical analysis of the temperature distribution of the steel tube 31 for the case in which the wall thickness of the steel tube 31 was 3 mm and the current frequency f was 25 kHz. FIG. 3 shows the dependence of the high temperature portion of the steel tube 31 on the feed speed. In FIG. 3 and below-described FIGS. 4-6, the line at the upper portion of the steel tube 31 indicates the outer surface of the steel tube 31 and the line at the lower portion of the steel tube 31 indicates the inner surface of the steel tube 31.

In general, the resistance to deformation of a steel material greatly decreases in a temperature range of 800° C. and above. Therefore, in this numerical analysis, the heated region was made one in which the temperature increased to at least 800° C. All calculations were carried out under conditions such that the maximum temperature of the outer surface of the steel tube 31 was 1000° C.

As shown in FIG. 3, as the feed speed V increased from 5 to 10, 50, 75, 100, 125, and 150 mm/sec, the difference in temperature between the outer surface and the inner surface of the steel tube 1 increased. This is because the outer surface of the steel tube 31 is directly heated by induction heating, while the inner surface of the steel tube 31 is heated only by conduction from the outer surface. Therefore, the higher the feed speed V of the steel tube 31, the smaller is the time for which the inner surface of the steel tube 31 is heated.

As shown in FIG. 3, when the feed speed V of the steel tube 31 is 5 or 10 mm/sec, there is almost no temperature difference between the inner surface and the outer surface of the steel tube 31, and bending can be carried out without any problems. When performing bending of a steel material, the uniformity of temperature in the plate thickness direction (the uniformity of the temperature distribution) is important, and particularly it is necessary to control the width of the region in which the temperature is at 800° C. or above (referred to below as the effective heated width).

When the feed speed V of the steel tube 31 becomes 50 mm/sec, the effective heated width (the region shown by A in FIG. 3) becomes narrow. When the feed speed V of the steel tube 31 reaches 75 mm, the effective heated width A becomes nearly 0. If the effective heated width A is 0, it becomes impossible to perform bending with good accuracy. When the feed speed V of the steel tube 31 becomes 100 mm/sec or higher, the inner surface of the steel tube 31 can no longer be heated to at least 800° C. and it becomes impossible to carry out bending.

In this manner, the higher the feed speed V of the steel tube 31 or the larger the wall thickness of the steel tube 31, the more the effective heated width of the steel tube 31 decreases, and it becomes more difficult to carry out bending. Based on the above results, the feed speed V of the steel tube 31 is made at least 5 mm/sec to at most 150 mm/sec.

It is not easy to vary the current frequency f of an induction heating mechanism, so it is necessary to select a suitable current frequency f when designing the induction heating mechanism.

Figure 4:
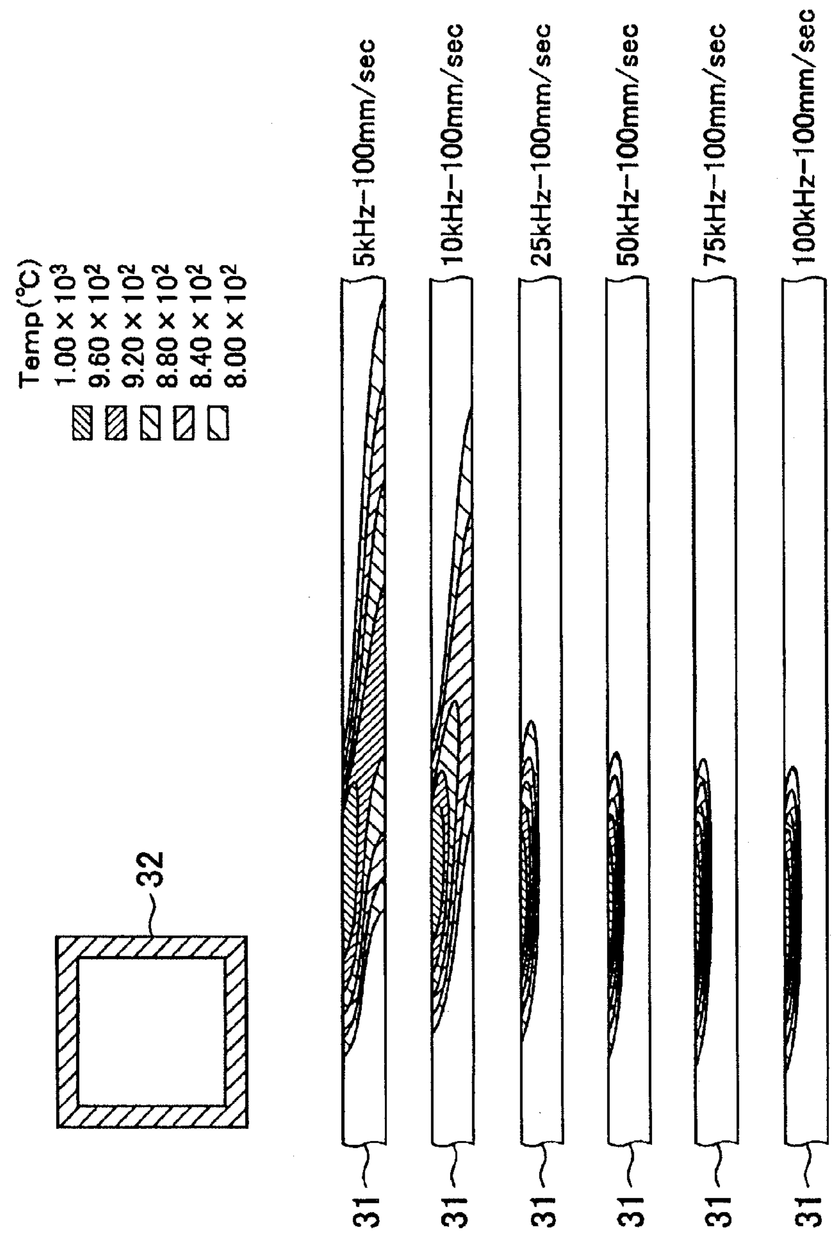
FIG. 4 is an explanatory view showing the change in the heated region when the current frequency f was varied (the wall thickness of the steel tube was 3 mm, and the feed speed f was 100 mm/sec).

FIG. 4 is an explanatory view showing the changes in the heated region when the current frequency f was varied (wall thickness of steel tube 31=3 mm, feed speed V=100 mm/sec).

The lower the current frequency f, the deeper is the electromagnetic skin depth heated by induction heating. Therefore, when the feed speed V of the steel tube 31 is constant, the lower the current frequency f, the more of the inner surface of the steel tube 31 can be heated to 800° C. or above. However, in the present invention, the lower the current frequency f, the larger is the effective heated width A by induction heating, so the dimensional accuracy of the bent member decreases.

Figure 5:
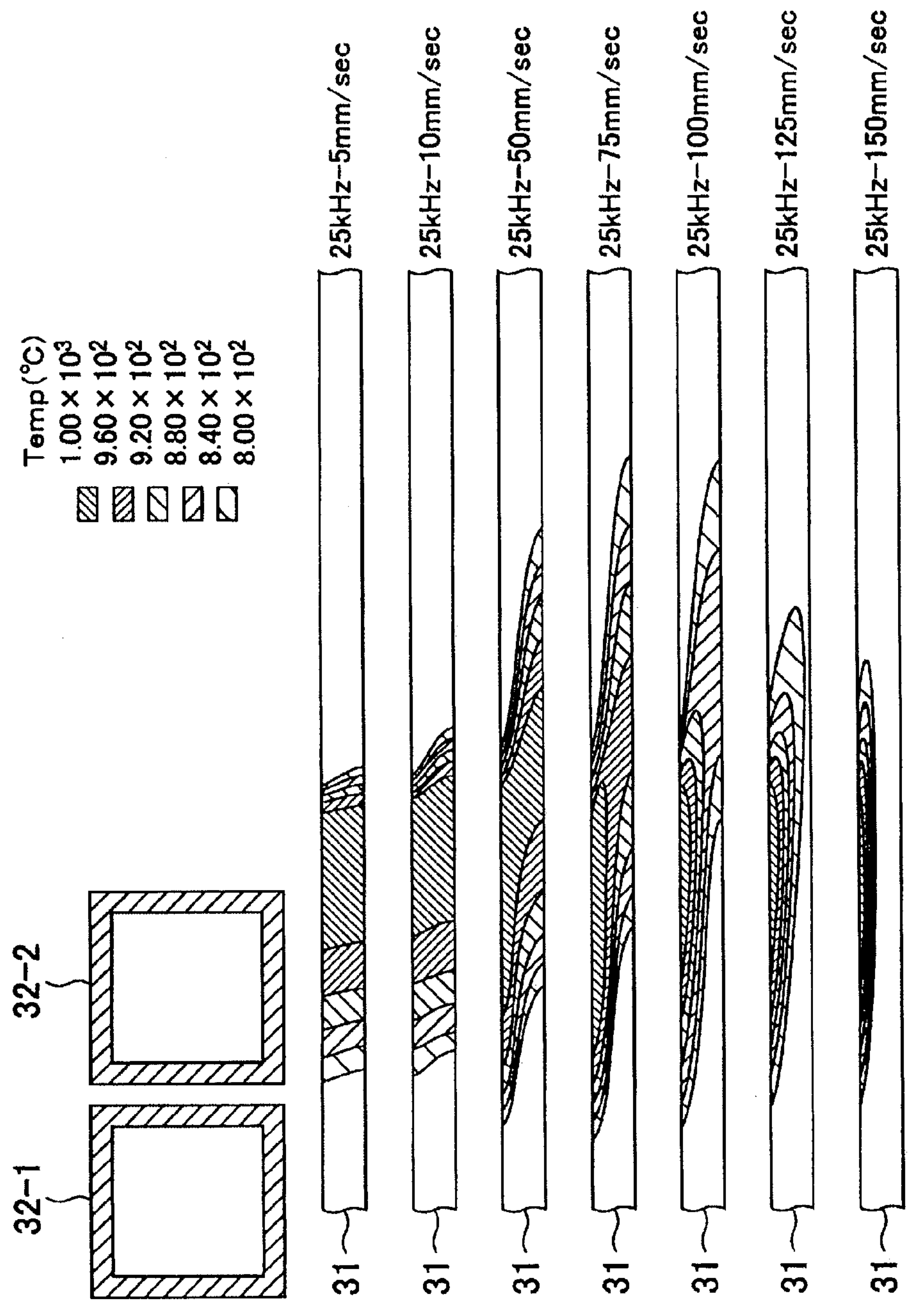
FIG. 5 is an explanatory view showing the results of numerical analysis for the case in which current with a current frequency of 25 kHz is supplied to a 2-winding induction heating coil and the feed speed V of a steel tube is varied.
Figure 6:
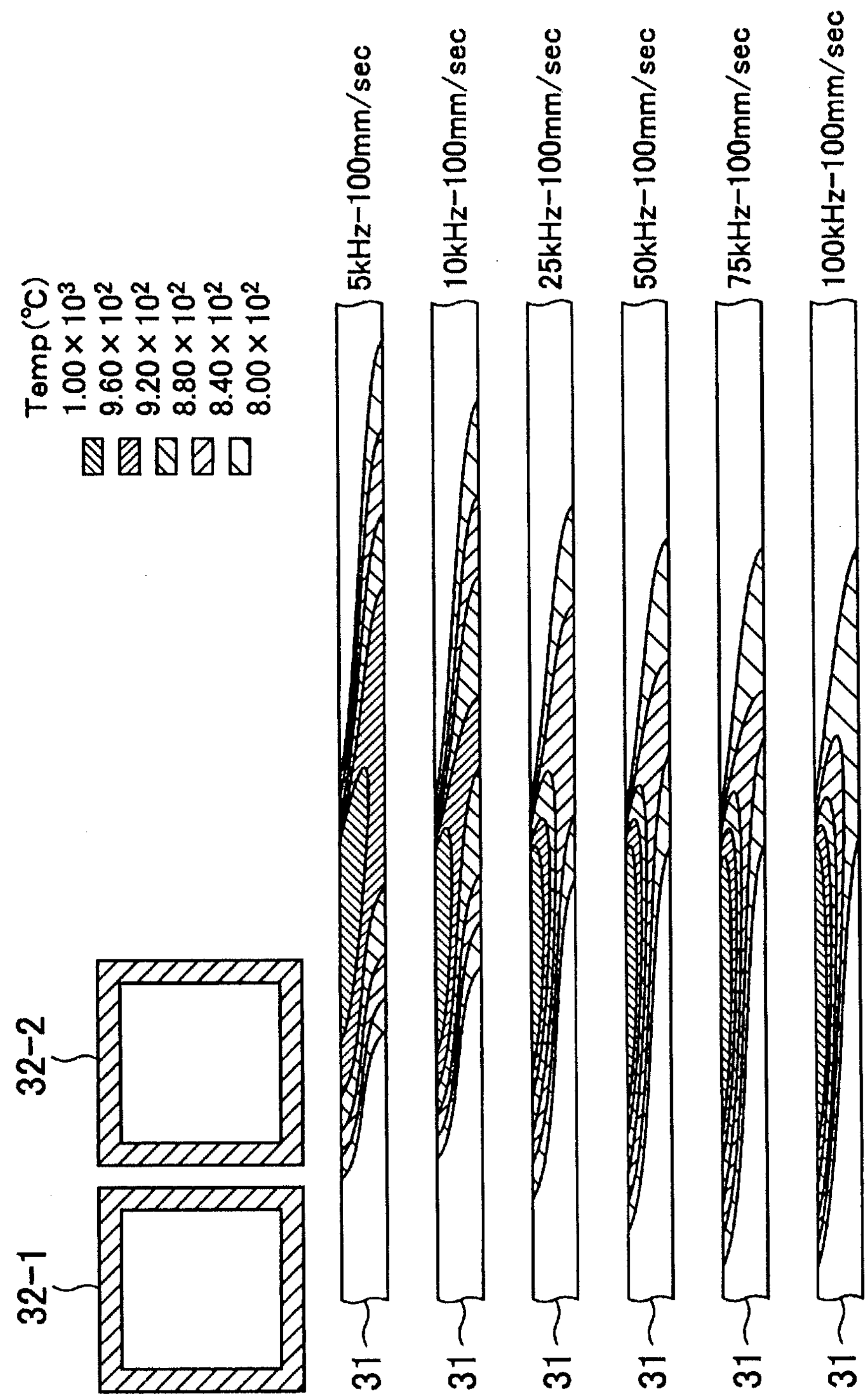
FIG. 6 is an explanatory view showing the results of numerical analysis for the case in which the current frequency f of current supplied to a 2-winding induction heating coil is varied and a steel tube is fed with a feed speed V of 100 mm/sec.

FIG. 5 is an explanatory view showing the results of analysis when current with a current frequency f of 25 kHz was supplied to an induction heating coil having 2 windings 31-1 and 31-2 and the feed speed V of the steel tube 31 was varied. FIG. 6 is an explanatory view showing the results of analysis when the current frequency f of the current supplied to the induction heating coils having 2 windings 31-1 and 31-2 was varied and the steel tube 31 was fed at a speed of 100 mm/sec.

From a comparison of the results shown in FIGS. 5 and 6 and the results shown in FIGS. 3 and 4, it can be seen that as the number of windings of the induction heating coil increases, the position of the start of heating of the steel tube 31 moves towards the upstream side. Therefore, although the effective heated width A increases in the axial direction of the steel tube 31, it is possible to perform heating up to the inner surface of the steel tube 31.

As a result of carrying out a large number of analyses which varied the number of windings of the induction heating coil 32, the current frequency f, and the feed speed V of the steel tube 31 as shown in FIGS. 3-6, the present inventors determined the relationship between the feed speed V, the current frequency f, and the wall thickness such that the effective heat width A does not become zero. Table 1 shows the relationship between the current frequency f, the feed speed V, and the wall thickness of a steel tube which can be bent when using an induction heating coil having 1 winding.

TABLE 1

| V (mm/sec) | f (kHz) | | | | | |
|---|---|---|---|---|---|---|
| | 5 | 10 | 25 | 50 | 75 | 100 |
| 5 | – | – | – | – | – | – |
| 10 | – | – | – | – | – | – |
| 50 | – | – | 3.0 | 3.0 | 3.0 | 3.0 |
| 75 | – | 3.0 | 2.8 | 2.8 | 2.8 | 2.8 |
| 100 | – | 3.0 | 2.6 | 2.4 | 2.4 | 2.4 |
| 125 | 3.0 | 2.8 | 2.4 | 2.2 | 2.2 | 2.2 |
| 150 | 3.0 | 2.8 | 2.2 | 2.0 | 2.0 | 2.0 |

The dash symbols (..) in Table 1 indicates that the effective heated width A is greater than zero with a wall thickness of at most 3 mm, namely, it indicates that a steel tube with a wall thickness of at most 3 mm can be subjected to bending. The numbers in Table 1 indicate the critical working thickness (mm); namely, the effective heat width A becomes zero when the wall thickness exceeds this value. Thus, if the maximum wall thickness of a steel tube 31 for use with manufacturing apparatus 0 is made 3 mm, the conditions in the region surrounded by the dashed line in Table 1 are the conditions under which bending is possible.

The induction heating coil 32 is typically made of a copper alloy. The current which can be passed through the induction heating coil 32 depends upon the cross-sectional area of the induction heating coil 32 and the cooling method, but it is normally a maximum of 10,000 A. As shown in Table 1, in order to increase the feed speed V of the steel tube 31, it is necessary to lower the current frequency f. If the current frequency f is lowered, the current in the induction heating coil 32 increases.

Table 2 shows the current (A) which needs to be supplied to an induction heating coil 32 having 1 winding in order to perform heating to 1000° C. when a steel tube 31 has a wall thickness of 3 mm.

TABLE 2

| V (mm/sec) | f (kHz) | | | | | |
|---|---|---|---|---|---|---|
| | 5 | 10 | 25 | 50 | 75 | 100 |
| 5 | 4031 | 2737 | 1973 | 1701 | 1566 | 1465 |
| 10 | 5715 | 3906 | 2789 | 2386 | 2208 | 2081 |
| 50 | 13100 | 8908 | 6312 | 5352 | 4894 | 4593 |
| 75 | 15945 | 10719 | 7210 | 5948 | 5518 | 5193 |
| 100 | 18301 | 12121 | 8018 | 6381 | 5866 | 5514 |
| 125 | 20358 | 13515 | 8747 | 6804 | 6054 | 5783 |
| 150 | 22181 | 14957 | 9423 | 7154 | 6415 | 5966 |

As shown by the region surrounded by the dashed line in Table 2, when the current frequency f is low and the feed speed V of the steel tube 31 is high, the current exceeds 10,000 A, so it is impossible from a practical standpoint to carry out induction heating.

As shown in Table 1, in order to make the feed speed V of the steel tube 31 at least 100 mm/sec, it is necessary to make the current frequency f at most 10 kHz. However, with an induction heating coil 32 having 1 winding, the current ends up exceeding 10,000 A.

In order to solve this problem, it is effective for the induction heating coil to have 2 windings. By increasing the number of windings from 1 to 2, it is possible to decrease the current per winding, but the heated width in the axial direction of the steel tube 31 increases.

From Tables 1 and 2, it can be seen that when the induction heating coil has 1 winding, conditions in which the feed speed V is at most 150 mm/sec and the current frequency f is 25-75 kHz are suitable for heating a steel tube 31 having a wall thickness of 2.0 mm.

Table 3 shows the results of numerical analysis of the current (A) necessary for heating a steel tube 31 to 1000° C. when the induction heating coil has 2 winding and the wall thickness of the steel tube 31 is 3 mm.

TABLE 3

| V (mm/sec) | f: (kHz) | | | | | |
|---|---|---|---|---|---|---|
| | 5 | 10 | 25 | 50 | 75 | 100 |
| 5 | 3181 | 1876 | 1080 | 832 | 753 | 735 |
| 10 | 4389 | 2619 | 1534 | 1184 | 1067 | 1016 |
| 50 | 9885 | 6178 | 3752 | 2907 | 2610 | 2451 |
| 75 | 13776 | 7677 | 4756 | 3682 | 3286 | 3083 |
| 100 | 16173 | 9071 | 5633 | 4339 | 3869 | 3633 |
| 125 | 18410 | 9984 | 6391 | 4938 | 4427 | 4143 |
| 150 | 20433 | 11407 | 7084 | 5492 | 4904 | 4601 |

As shown in Table 3, when the induction heating coil has 2 windings, even if the current frequency f is 10 kHz, it is possible to carry out bending with a feed speed V of 100 mm/sec. The conditions in the region surrounded by the dashed line in Table 3 show the conditions for which the current exceeds 10,000 A and in which it is impossible from a practical standpoint to carry out induction heating.

Table 4 shows the results of analysis of the region in which the effective heated width A is higher than zero when the induction heating coil has 2 windings. The symbols and numbers in Table 4 are the same as in Table 1.

TABLE 4

| V (mm/sec) | f (kHz) | | | | | |
|---|---|---|---|---|---|---|
| | 5 | 10 | 25 | 50 | 75 | 100 |
| 5 | – | – | – | – | – | – |
| 10 | – | – | – | – | – | – |
| 50 | – | – | – | – | – | – |
| 75 | – | – | – | – | – | – |
| 100 | – | – | 3.0 | 3.0 | 3.0 | 3.0 |
| 125 | – | 3.0 | 2.8 | 2.6 | 2.6 | 2.6 |
| 150 | 3.0 | 3.0 | 2.6 | 2.4 | 2.4 | 2.4 |

As shown by the region surrounded by the dashed line in Table 4, when the induction heating coil has 2 windings, the heated width is greater than with 1 winding, so the conditions in which the effective heated width A can be guaranteed are expanded.

FIG. 5 shows the effective heated width A (mm) when the induction heating coil has one winding, and FIG. 6 shows the effective heated width A (mm) when the induction heating coil has 2 windings.

TABLE 5

| V (mm/sec) | f (kHz) | | | | | |
|---|---|---|---|---|---|---|
| | 5 | 10 | 25 | 50 | 75 | 100 |
| 5 | 16.54 | 15.12 | 15.83 | 17.74 | 18.38 | 19.08 |
| 10 | 17.10 | 15.65 | 16.15 | 18.29 | 19.35 | 20.12 |
| 50 | 20.33 | 19.04 | 19.64 | 21.46 | 22.47 | 23.10 |
| 75 | 21.47 | 19.21 | 19.32 | 21.02 | 22.17 | 22.71 |
| 100 | 21.47 | 19.29 | 19.51 | 20.48 | 21.56 | 22.28 |
| 125 | 21.91 | 19.90 | 19.83 | 20.47 | 21.25 | 21.93 |
| 150 | 22.51 | 20.96 | 20.13 | 20.39 | 21.16 | 21.68 |

TABLE 6

| V (mm/sec) | f (kHz) | | | | | |
|---|---|---|---|---|---|---|
| | 5 | 10 | 25 | 50 | 75 | 100 |
| 5 | 23.75 | 21.94 | 23.54 | 26.33 | 27.32 | 27.86 |
| 10 | 23.94 | 22.19 | 23.72 | 26.52 | 28.38 | 29.00 |
| 50 | 27.99 | 26.77 | 28.32 | 29.32 | 33.82 | 34.73 |
| 75 | 29.01 | 27.63 | 29.40 | 33.34 | 35.02 | 35.73 |
| 100 | 29.48 | 27.67 | 29.97 | 32.96 | 34.86 | 36.07 |
| 125 | 29.86 | 27.37 | 30.51 | 32.51 | 34.37 | 35.49 |
| 150 | 29.98 | 27.39 | 30.35 | 31.94 | 33.91 | 35.30 |

As shown in Table 5, the effective heated width A becomes at most 25 mm under all conditions with 1 winding, but as shown by the region surrounded by the dashed line in Table 6, when there are 2 windings, depending upon the conditions, the effective heated width A sometimes exceeds 30 mm.

In order to guarantee the working accuracy of the manufacturing apparatus 0, the effective heated width A is preferably as narrow as possible. The effective heated width A (mm) is preferably at most around 30 mm. When the wall thickness of the steel tube 31 is at most 2.0 mm, using an induction heating coil 32 having 1 winding can decrease the effective heated width A (mm), whereby the dimensional accuracy of a bent member can be guaranteed. From Table 1 and Table 2, it can be seen that in that situation, the feed speed V is preferably at most 150 mm/sec and the current frequency f is preferably from 25 kHz to 100 kHz.

When the wall thickness is greater than 2.0 mm and at most 3.0 mm, it is preferable to use an induction heating coil of 2 windings 32-1 and 32-2. In this case as well, it is preferable for the effective heated width A to be at most 30 mm in order to guarantee the dimensional accuracy of the bent member.

Figure 7:
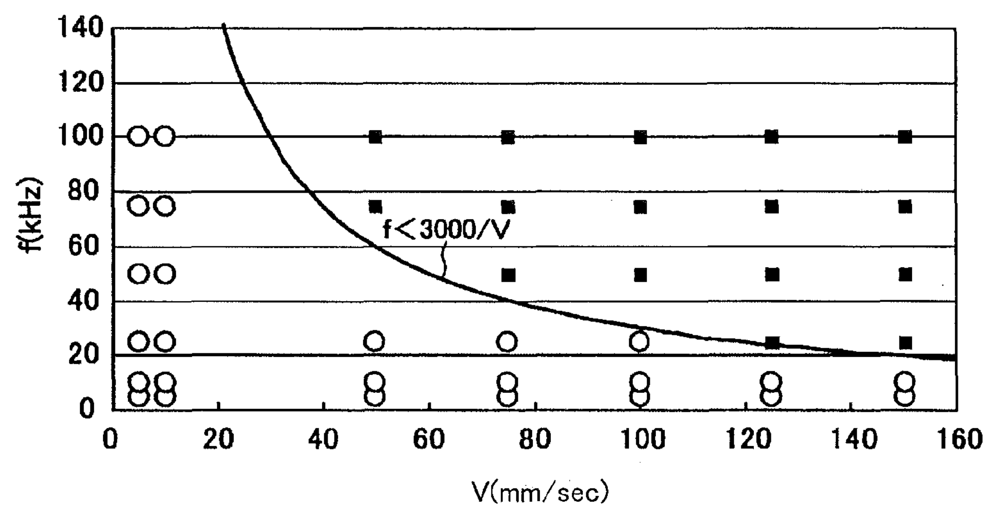
FIG. 7 is a graph showing the relationship between the feed speed V, the current frequency f, and the heating width when using a 2-winding induction heating coil.

The relationship shown in Table 6 is illustrated by a graph in FIG. 7. The hollow circles in the graph of FIG. 7 show the case in which the effective heated width A is at most 30 mm, and the solid squares show the case when the effective heated width A exceeds 30 mm.

As shown by the graph in FIG. 7, the effective width A can be made at most 30 mm if the current frequency f (kHz) and the feed speed V (mm) satisfy the relationship given by the approximate formula f<3000/V.

From the graph shown in FIG. 7, it can be seen that a current frequency of at most 25 kHz is preferred when using an induction heating coil of 2 windings 32-1 and 32-2. However, when the current frequency f is low, it is necessary to take into consideration the current which can pass through the coil as shown in Table 3.

Figure 8:
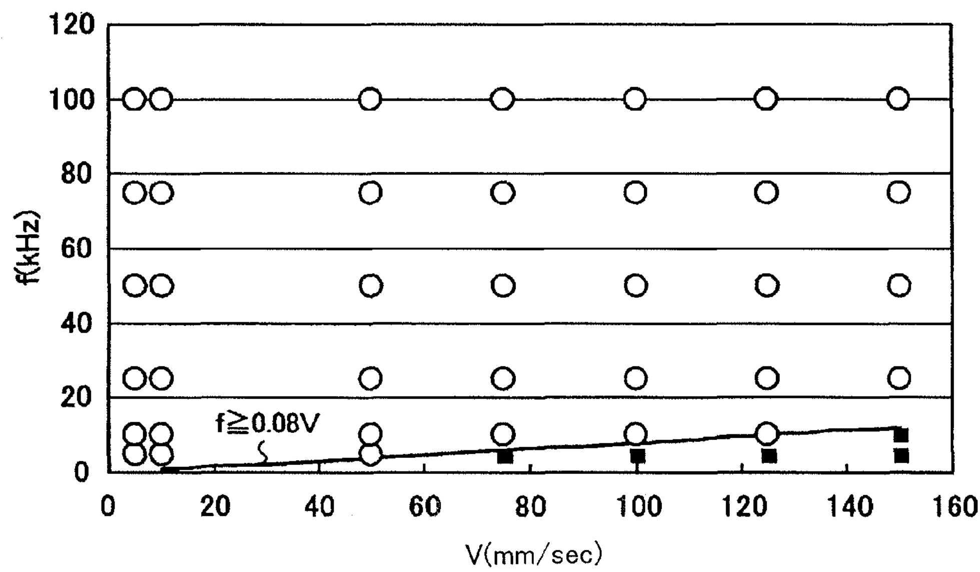
FIG. 8 is a graph showing the relationship between the feed speed V, the current frequency f, and the maximum possible current when using a 2-winding induction heating coil.

This relationship is shown by a graph in FIG. 8. The hollow circles in the graph of FIG. 8 show a current value which can pass through the coil, and the solid squares show a current value which cannot pass through the coil.

From the graph of FIG. 8, the region in which the current can pass through the coil when an induction heating coil of 2 windings 32-1 and 32-2 is used is the region given by the approximate formula f≥0.08 V.

Figure 9:
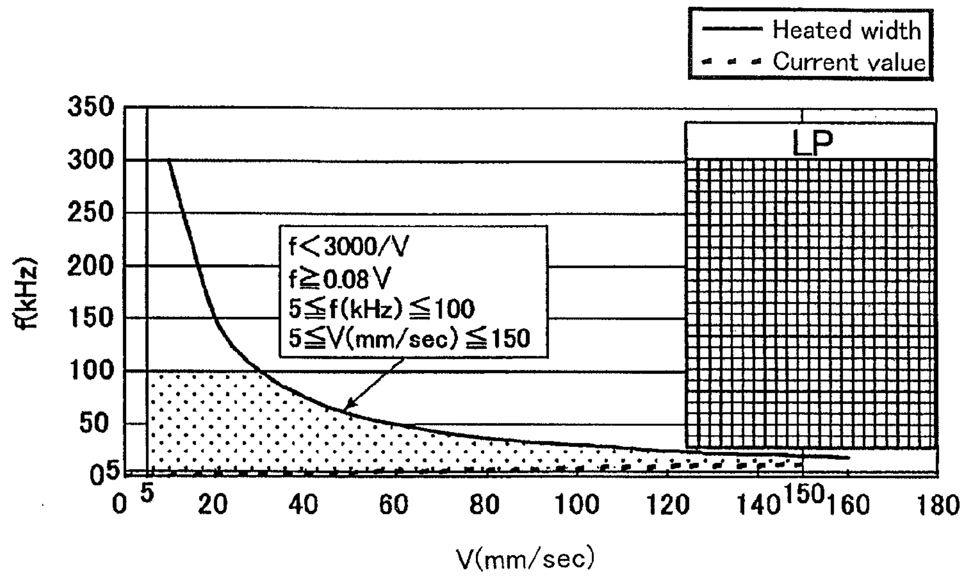
FIG. 9 is a graph showing the range for an appropriate feed speed V and an appropriate current frequency f when using a 2-winding induction heating coil.

FIG. 9 is a graph showing the region in FIG. 7 where the effective heated width A is at most around 30 mm in combination with the region in FIG. 8 where the current can pass. In the graph of FIG. 9, the region in which the effective heated width A cannot be guaranteed regardless of how the current frequency f and the feed speed V are adjusted is shown by portion LP marked with a lattice (f≥25 kHz and V≥125 mm/sec).

For the above-mentioned reasons, when the wall thickness of the steel tube 1 is at most 2.0 mm, the steel tube 1 is fed by the feed mechanism 11 at a feed speed V of 5-150 mm/sec, and induction heating of the steel tube 1 is carried out using an induction heating coil 14*a* having 1 winding as the heating mechanism 14 and by supplying the induction heating coil 14*a* of 1 winding with an alternating current having a current frequency f of 5-100 kHz.

When the wall thickness of the steel tube 1 is greater than 2.0 mm and at most 3.0 mm, an induction heating coil 14*a* having 2 windings is used as the heating mechanism 14, and the feed mechanism 11 and the heating mechanism 14 are preferably adjusted so that the feed speed V (mm/sec) of the steel tube 1 by the feed mechanism 11 and the current frequency f (kHz) of the alternating current supplied to the induction heating coil 14*a* satisfy the relationships f<3000/V and f≥0.08 V, under the conditions 5 kHz≤f≤100 kHz and 5 mm/sec≤V≤150 mm/sec.

As stated above, when the steel tube 1 is heated using an induction heating coil 14*a* with 2 windings, the heated width A of the steel tube 1 slightly increases, but such a heating coil can be applied even when the wall thickness of the steel tube 1 is at most 2.0 mm.

By varying the distance between the steel tube 1 and the induction heating coil 14*a* in a direction which is parallel to the direction perpendicular to the axial direction of the steel tube 1, it is possible to non-uniformly heat at least a portion of the steel tube 1 in the circumferential direction.

Furthermore, by heating the steel tube 1 with at least one additional heating mechanism disposed on the upstream side of heating mechanism 14, it is possible to heat the steel tube 1 two or more times or to non-uniformly heat a portion of the steel tube 1 in the circumferential direction.

[Cooling Mechanism 16]

The cooling mechanism 16 is disposed at a third position C on the downstream side of the second position B in the feed direction of the steel tube 1. The cooling mechanism 16 cools the heated steel tube 1. By cooling the steel tube 1 with the cooling mechanism 16, a high temperature portion 1*a* which moves in the axial direction of the steel tube 1 is locally formed. The high temperature portion 1*a* has a resistance to deformation which is much lower than that of other portions.

The cooling mechanism 16 can be any mechanism which can cool the steel tube 1 at a desired cooling speed, and it is not limited to a specific type of cooling mechanism. In general, an example of the cooling mechanism is a water cooling mechanism which cools the steel tube 1 by spraying cooling water at a predetermined position on the outer peripheral surface of the steel tube 1.

As shown in FIG. 1, cooling water is sprayed so as to be sloped toward the feed direction of the steel tube 1. By varying the distance of the cooling mechanism 16 with respect to the steel tube 1 in a direction which is parallel to the direction perpendicular to the axial direction of the steel tube 1, the length of the high temperature portion 1*a* in the axial direction can be adjusted.

[Gripping Mechanism 15]

The gripping mechanism 15 is disposed in a region D downstream of the third position C in the feed direction of the steel tube 1. The gripping mechanism 15 moves three-dimensionally in a direction including at least the feed direction of the steel tube 1 within a workspace including a space on the upstream side of the third position C in the feed direction of the steel tube 1. As a result, the gripping mechanism 15 imparts a bending moment to the high temperature portion 1*a* formed in the steel tube 1. In general a chuck mechanism is used as the gripping mechanism 15.

In the present invention, the gripping mechanism 15 which can move three-dimensionally can of course move two-dimensionally. By moving the gripping mechanism 15 two-dimensionally, it is possible to carry out bending in which the bending direction varies two-dimensionally and to manufacture a bent member having a bending direction which varies two-dimensionally such as is the case with S-shaped bending.

The workspace means a three-dimensional space defined by Equations (3), (4), and (5).

$$x<0, \text{ and } (y=0 \text{ or } y\geq 0.5D), \text{ and } 0\leq\theta<360° \quad (3)$$

$$x^2+(y-R_{min})^2\geq R_{min}^2 \quad (4)$$

$$x^2+(y+R_{min})^2\geq R_{min}^2-(0.5D-R_{min})^2+(0.5D+R_{min})^2 \quad (5)$$

In Equations (3)-(5), D means the smallest outer dimension (mm) of the bent member, $R_{min}$ means the smallest radius of curvature (mm) of the bent member, and x, y, and θ are cylindrical coordinates having the second position as an origin, wherein a positive value for x is in the instantaneous feed direction of the bent member, y is in the direction perpendicular to x in a horizontal plane, and θ is the angle in the circumferential direction.

The gripping mechanism 15 bends the steel tube 1 by moving three-dimensionally within the workspace, whereby a bent member having bent portions intermittently or continuously in its lengthwise direction is manufactured.

The workspace is a subjective space, so objects such as various mechanisms can be present in the workspace.

The gripping mechanism 15 includes a body 17 with a pillar-like outer shape and a moving mechanism 20.

The body 17 is constituted by a hollow member. The hollow member has an inner peripheral surface having a shape fitting the outer peripheral surface of the steel tube 1. The body 17 grips the steel tube 1 by contacting the outer surface of the end of the steel tube 1.

In contrast to the example shown in FIG. 1, the body 17 may be constituted by a tubular member having an outer peripheral surface with a shape fitting the inner peripheral surface of the steel tube 1. In this case, the body 17 grips the steel tube 1 by being inserted into the end of the steel tube 1.

The moving mechanism 20 is constituted by a first base 18 and a second base 19. The body 17 is mounted on the first base 18, and the first base 18 can move in a direction perpendicular to the feed direction of the steel tube at the first position A (in the vertical direction in FIG. 1). The second base 19 is disposed so as to be able to move the first base 18 in the feed direction.

Movement of the first base 18 and the second base 19 is individually carried out by a ball screw and a drive motor. The body 17 can be moved two-dimensionally in a horizontal plane by the moving mechanism 20. Reference number 22 in FIG. 1 indicates an x axis tilt motor, reference number 23 indicates an x axis shift motor, reference number 24 indicates a y axis tilt motor, reference number 25 indicates a y axis shift motor, reference number 26 indicates a z axis tilt motor, and reference number 27 indicates an x axis shift motor.

Instead of the moving mechanism 20 shown in FIG. 1, the body 17 may be supported by an articulated robot having joints which can rotate around at least one axis.

Figure 10:
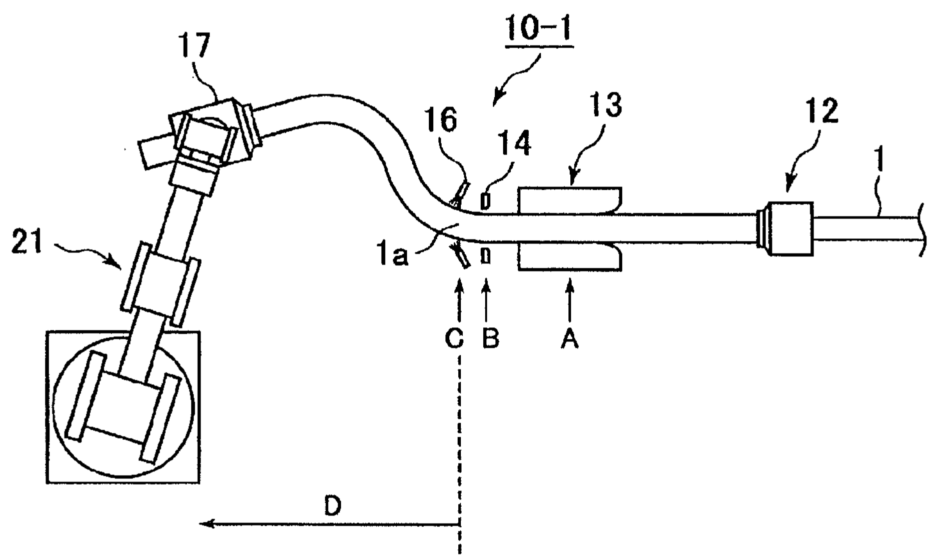
FIG. 10 is an explanatory view schematically showing the structure of a manufacturing apparatus using an articulated robot.
Figure 11:
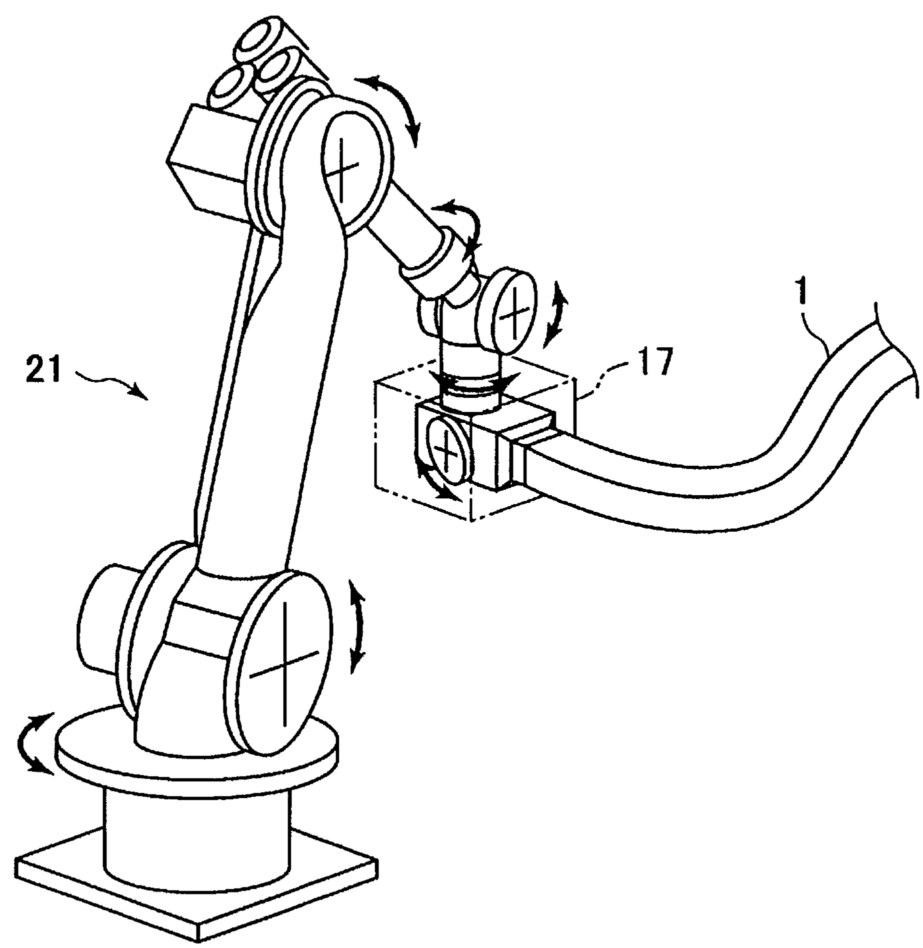
FIG. 11 is an explanatory view showing an articulated robot.
Figure 12:
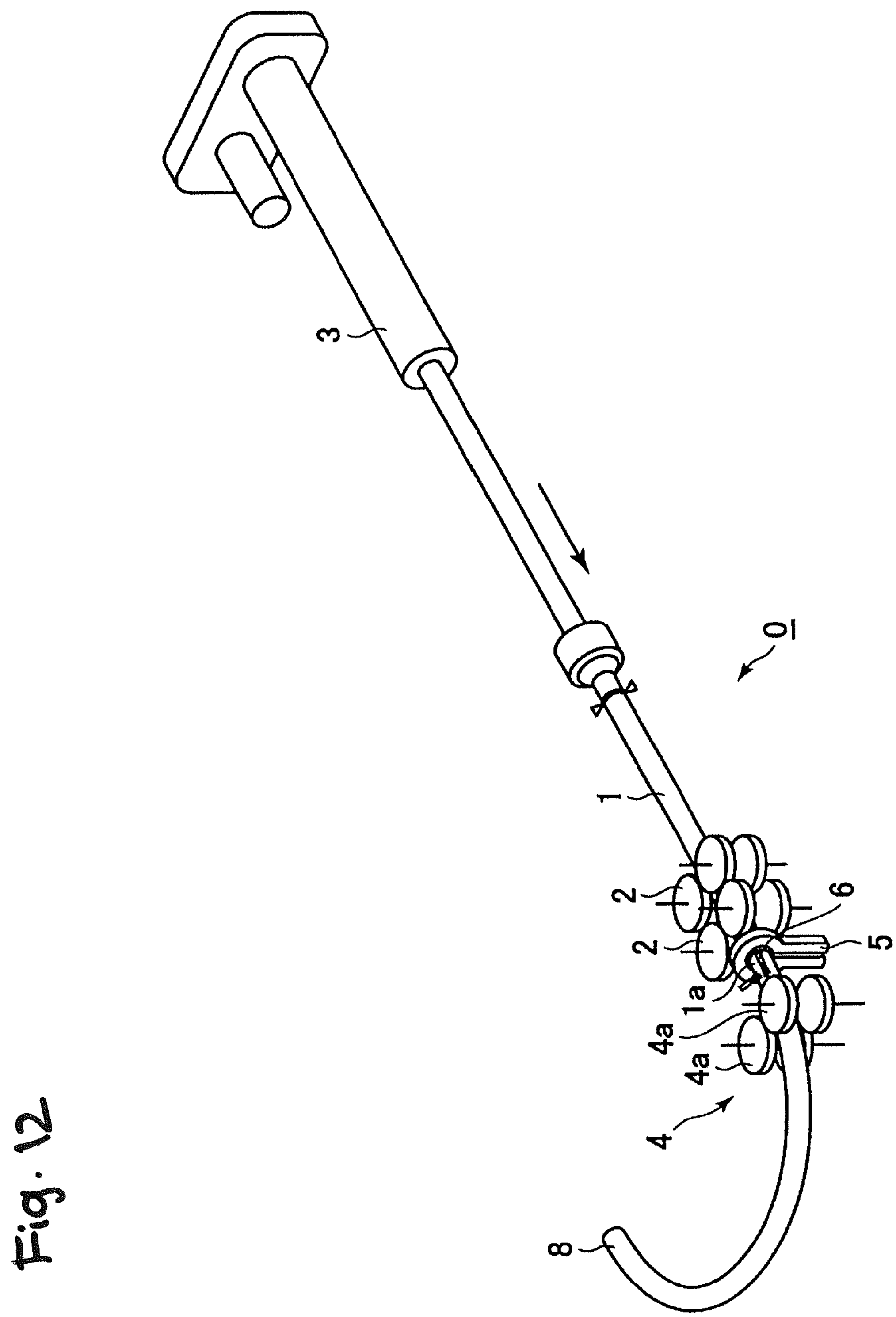
FIG. 12 is an explanatory view schematically showing a manufacturing apparatus disclosed in Patent Document 1.

FIG. 10 is an explanatory view schematically showing the structure of a manufacturing apparatus 10-1 using an articulated robot 21, and FIG. 11 is an explanatory view showing the articulated robot 21.

The articulated robot 21 can easily support the body 17 so as to be able to move three-dimensionally in a direction including at least the feed direction of the steel tube 1.

Next, the state when manufacturing a bent member by this manufacturing apparatus 10 will be explained.

First, an elongated steel tube 1 is supported at the first position A by the support mechanism 13 and is fed in its lengthwise direction by the feed mechanism 11.

Next, when the wall thickness of the steel tube 1 is at most 2.0 mm, the feed mechanism 11 feeds the steel tube 1 with a feed speed V of 5-150 mm/sec, and by supplying an alternating current with a current frequency V of 5-100 kHz to the induction heating coil 14*a* of 1 winding which constitutes the heating mechanism 14 disposed at the second position B, the steel tube is subjected to induction heating.

When the wall thickness of the steel tube 1 is greater than 2.0 mm and at most 3.0 mm, the steel tube 1 undergoes induction heating by controlling the feed speed V (mm/sec) of the steel tube 1 by the feed mechanism 11 and the current frequency f (kHz) of the alternating current supplied to the induction heating coil 14*a* of 2 winding which constitutes the heating mechanism 14 so as to satisfy the relationships $f<3000/V$ and $f\geq0.08$ V.

Next, a high temperature portion 1*a* is formed in the steel tube 1 by cooling the steel tube 1 by the cooling mechanism 16 at the third position C.

Then, in region D, the position of the gripping mechanism 15 which grips the steel tube 1 is varied three-dimensionally in a direction including at least the feed direction of the steel tube 1 within the workspace to impart a bending moment to the high temperature portion 1*a* of the steel tube 1.

These processes are carried out over the entire length of the steel tube 1 in accordance with the target shape of the bent member. As a result, a bent member having a bent portion which is three-dimensionally bent intermittently or continuously in the lengthwise direction is continuously manufactured.

By locally heating the steel tube 1 at the second position B to a temperature range in which quench hardening is possible (to at least the $Ac_3$ point) and rapidly cooling it at a predetermined cooling speed at the third position C, it is possible to harden at least a portion of the steel tube 1. As a result, a bent member intermittently or continuously having a hardened portion at least in the lengthwise direction and/or in the circumferential direction in a cross section crossing the lengthwise direction is manufactured.

A bent member can be continuously manufactured by disposing the manufacturing apparatus 10 on the exit side of a manufacturing apparatus for seam welded steel tube. Specifically, a continuous manufacturing apparatus may comprise an uncoiler for continuously paying out a steel strip, a forming apparatus for forming the paid out steel strip into a tube having a predetermined cross-sectional shape, a welding apparatus for welding the abutting side edges of the steel strip to form a continuous tube, a post-treatment apparatus which cuts off the weld bead and if necessary performs post-annealing or sizing, and a manufacturing apparatus 10 disposed on the exit side of the post-treatment apparatus.

A bent member can also be continuously manufactured using a continuous manufacturing apparatus comprising a roll forming line constituted by an uncoiler for continuously paying out a steel strip and a forming apparatus for forming the paid-out steel strip into a desired cross-sectional shape, and a manufacturing apparatus 10 disposed on the exit side of the forming apparatus.

The manufacturing apparatus 10 can stably form a high temperature portion 1*a* which is uniform in the circumferential direction of a steel tube 1 in a narrow region in the axial direction of the steel tube 1. As a result, it can efficiently and inexpensively manufacture a bent member having a high strength and excellent shape retention, having a predetermined hardness distribution and a desired dimensional accuracy, and having at least two portions in the lengthwise direction with different radii of curvature from each other instead of a constant radius of curvature in the lengthwise direction.

The manufacturing apparatus 10-1 grips a steel tube 1 with a gripping mechanism 15 which is supported by an articulated robot or the like and carries out bending of a steel tube 1. Therefore, a bent portion can be provided with a large bending angle, the surface can keep good condition because surface flaws can be suppressed, dimensional accuracy can be guaranteed, and a bent member can be manufactured with excellent operating efficiency.

The invention claimed is:

1. A method of manufacturing a bent member having a bent portion which is bent three-dimensionally intermittently or continuously in its lengthwise direction comprising supporting a hollow elongated metal material having a closed transverse cross-sectional shape at a first position while feeding it in its lengthwise direction, forming a high temperature portion which moves in the axial direction of the metal material by performing induction heating of the metal material at a second position located downstream of the first position in the feed direction of the metal material using an induction heating coil and cooling the metal material at a third position located downstream of the second position in the feed direction of the metal material, and three-dimensionally varying the position of a gripping mechanism which grips the metal material in a region downstream of the third position in the feed direction of the metal material to apply a bending moment to the high temperature portion, characterized in that when the wall thickness of the metal material is at most 2.0 mm, the feed speed of the metal material is made 5-150 mm/sec, an induction heating coil having 1 winding is used as the induction heating coil, and an alternating current at 5-100 kHz is applied to the induction heating coil.

2. A method of manufacturing a bent member as set forth in claim 1 wherein the bent member has at least two portions in its lengthwise direction which are different in bending radius from each other.

3. A method of manufacturing a bent member as set forth in claim 1 wherein the metal material has a transverse cross-sectional shape which is circular, rectangular, elliptical, oblong, polygonal, a combination of a polygon and a circle, or a combination of a polygon and an ellipse.

4. A method of manufacturing a bent member as set forth in claim 1 wherein the gripping mechanism grips the metal material by being inserted into an end of the metal material.

5. A method of manufacturing a bent member as set forth in claim 1 wherein the gripping mechanism grips the metal material by contacting the outer surface of an end of the metal material.

6. A method of manufacturing a bent member as set forth in claim 1 wherein the metal material is hardened in at least a portion of its lengthwise direction by being locally heated at the second position to a temperature at which quench hardening is possible and being cooled at the third position.

7. A method of manufacturing a bent member as set forth in claim 1 wherein the bent member intermittently or continuously has a hardened portion in its lengthwise direction and/or in the circumferential direction in a cross section which crosses the lengthwise direction.

8. A manufacturing apparatus for a bent member comprising a feed mechanism for feeding an elongated hollow metal material having a closed transverse cross-sectional shape in its lengthwise direction, a support mechanism for supporting the metal material being fed at a first position, a heating mechanism for induction heating of the metal material being fed at a second position located downstream of the first position in the feed direction of the metal material, a cooling mechanism for cooling the heated portion of the metal material at a third position located downstream of the second position in the feed direction of the metal material to locally form in the metal material a high temperature portion which moves in the axial direction of the metal material, and a gripping mechanism which moves three-dimensionally while gripping the metal material being fed in a region downstream of the third position in the feed direction of the metal material to apply a bending moment to the high temperature portion, characterized in that when the wall thickness of the metal material is at most 2.0 mm, the feed mechanism feeds the metal material at 5-150 mm/sec, the heating mechanism has an induction heating coil with 1 winding, and the induction heating coil is supplied with an alternating current at 5-100 kHz.

9. A method of manufacturing a bent member having a bent portion which is bent three-dimensionally intermittently or continuously in its lengthwise direction comprising supporting a hollow elongated metal material having a closed transverse cross-sectional shape at a first position while feeding it in its lengthwise direction, forming a high temperature portion which moves in the axial direction of the metal material by performing induction heating of the metal material at a second position located downstream of the first position in the feed direction of the metal material using an induction heating coil and cooling the metal material at a third position located downstream of the second position in the feed direction of the metal material, and three-dimensionally varying the position of a gripping mechanism which grips the metal material in a region downstream of the third position in the feed direction of the metal material to apply a bending moment to the high temperature portion, characterized in that when the wall thickness of the metal material is greater than 2.0 mm and at most 3.0 mm, an induction heating coil having 2 windings is used as the induction heating coil, and the frequency (kHz) of the alternating current supplied to the induction heating coil and the feed speed (mm/sec) of the metal material are adjusted so as to satisfy the relationships given by the following Equations (1) and (2):

$$f<3000/V \quad (1)$$

$$f\geq 0.08V \quad (2)$$

wherein, f is the frequency, V is the feed speed, 5 kHz≤f≤100 kHz, and 5 mm/sec≤V≤150 mm/sec.

10. A manufacturing apparatus for a bent member comprising a feed mechanism for feeding an elongated hollow metal material having a closed transverse cross-sectional shape in its lengthwise direction, a support mechanism for supporting the metal material being fed at a first position, a heating mechanism for induction heating of the metal material being fed at a second position located downstream of the first position in the feed direction of the metal material, a cooling mechanism for cooling the heated portion of the metal material at a third position located downstream of the second position in the feed direction of the metal material to locally form in the metal material a high temperature portion which moves in the axial direction of the metal material, and a gripping mechanism which moves three-dimensionally while gripping the metal material being fed in a region downstream of the third position in the feed direction of the metal material to apply a bending moment to the high temperature portion, characterized in that when the wall thickness of the metal material is greater than 2.0 mm and at most 3.0 mm, the heating mechanism has an induction heating coil with 2 windings, and the feed mechanism and the heating mechanism adjust the feed speed (mm/sec) of the metal material by the feed mechanism and the frequency (kHz) of the alternating current supplied to the induction heating coil so as to satisfy the relationships give by the following Equation (1) and Equation (2):

$$f<3000/V \quad (1)$$

$$f\geq 0.08V \quad (2)$$

wherein f is the frequency, V is the feed speed, 5 kHz≤f≤100 kHz, and 5 mm/sec≤V≤150 mm/sec.

* * * * *